US011560334B2

(12) United States Patent
Robl et al.

(10) Patent No.: US 11,560,334 B2
(45) Date of Patent: Jan. 24, 2023

(54) CONCRETE REPAIR COATING

(71) Applicant: University of Kentucky Research Foundation, Lexington, KY (US)

(72) Inventors: Thomas Robl, Lexington, KY (US); Robert B. Jewell, Lexington, KY (US); Anne Oberlink, Lexington, KY (US); Tristana Duvallet, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 656 days.

(21) Appl. No.: 16/657,543

(22) Filed: Oct. 18, 2019

(65) Prior Publication Data

US 2020/0123058 A1 Apr. 23, 2020

Related U.S. Application Data

(60) Provisional application No. 62/749,384, filed on Oct. 23, 2018.

(51) Int. Cl.
| | |
|---|---|
| *C04B 28/06* | (2006.01) |
| *C04B 24/06* | (2006.01) |
| *C04B 24/10* | (2006.01) |
| *C04B 24/20* | (2006.01) |
| *C04B 24/12* | (2006.01) |
| *C04B 24/36* | (2006.01) |
| *C04B 24/02* | (2006.01) |
| *C04B 20/10* | (2006.01) |
| *C04B 40/00* | (2006.01) |
| *E01C 7/14* | (2006.01) |
| *E01C 7/18* | (2006.01) |
| *C04B 18/02* | (2006.01) |
| *C04B 111/00* | (2006.01) |
| *C04B 103/22* | (2006.01) |
| *C04B 103/30* | (2006.01) |
| *C04B 103/50* | (2006.01) |

(52) U.S. Cl.
CPC .......... *C04B 28/065* (2013.01); *C04B 18/021* (2013.01); *C04B 20/1044* (2013.01); *C04B 24/023* (2013.01); *C04B 24/06* (2013.01); *C04B 24/10* (2013.01); *C04B 24/128* (2013.01); *C04B 24/20* (2013.01); *C04B 24/36* (2013.01); *C04B 40/0032* (2013.01); *C04B 40/0042* (2013.01); *E01C 7/147* (2013.01); *E01C 7/187* (2013.01); *C04B 2103/22* (2013.01); *C04B 2103/302* (2013.01); *C04B 2103/50* (2013.01); *C04B 2111/0075* (2013.01); *C04B 2111/00663* (2013.01)

(58) Field of Classification Search
CPC C04B 7/02; C04B 7/323; C04B 14/06; C04B 14/28; C04B 18/021; C04B 20/008; C04B 20/1025; C04B 20/1044; C04B 24/023; C04B 24/06; C04B 24/10; C04B 24/20; C04B 24/22; C04B 24/128; C04B 24/36; C04B 24/2647; C04B 28/04; C04B 28/065; C04B 40/0028; C04B 40/0032; C04B 40/0042; C04B 40/0608; C04B 40/065; C04B 2103/22; C04B 2103/50; C04B 2103/302; C04B 2111/00663; C04B 2111/00482; C04B 2111/0075; C04B 2111/72; C09D 1/06; E01C 7/147; E01C 7/187; E01C 11/005
See application file for complete search history.

(56) References Cited

U.S. PATENT DOCUMENTS

| | | |
|---|---|---|
| 5,234,497 A | 8/1993 | Crocker |
| 5,472,499 A | 12/1995 | Crocker |
| 5,525,155 A | 6/1996 | Allen |
| 7,744,690 B2 | 6/2010 | Durst et al. |
| 8,016,938 B2 | 9/2011 | Durst et al. |
| 8,080,104 B2 | 12/2011 | Otsuka et al. |
| 8,158,699 B2 | 4/2012 | Freidrich et al. |
| 8,518,177 B2 | 8/2013 | Chattopadhyay et al. |
| 8,999,057 B2 | 4/2015 | Clodic et al. |
| 9,040,608 B2 | 5/2015 | Friedel et al. |
| 9,296,657 B2 | 3/2016 | Dal Bo et al. |
| 9,382,157 B2 | 7/2016 | Guzzetta et al. |
| 9,890,082 B2 | 2/2018 | Dubey |
| 9,950,954 B2 * | 4/2018 | Mikaelsson ........... C04B 24/023 |
| 10,221,096 B2 | 3/2019 | Dubey |
| 2004/0083926 A1 | 5/2004 | Mitkova et al. |
| 2008/0178769 A1 | 7/2008 | Goodwin et al. |
| 2014/0121302 A1 | 5/2014 | Brien |
| 2018/0050963 A1 * | 2/2018 | Hesse ................... C04B 28/146 |
| 2018/0162777 A1 * | 6/2018 | White ..................... C04B 28/16 |

\* cited by examiner

*Primary Examiner* — Anthony J Green
(74) *Attorney, Agent, or Firm* — Stites & Harbison PLLC; Warren D. Schickli

(57) ABSTRACT

A concrete and asphalt repair coating formulation includes a cement component and an aggregate component. The cement component includes a calcium sulfoaluminate cement and a Portland cement. The aggregate component includes coarse aggregates between 125-500 microns in diameter and fine aggregates between 5-62.5 microns in diameter.

20 Claims, 2 Drawing Sheets

CONCRETE REPAIR COATING

RELATED APPLICATION

This application claims priority to U.S. Provisional Patent Application 62/749,384 filed on Oct. 23, 2018, which is hereby incorporated by reference in its entirety.

TECHNICAL FIELD

This document relates generally to the field of concrete repair and, more particularly, to a new and improved concrete repair coating formulation characterized by a number of unique and beneficial qualities.

BACKGROUND

There are a number of commercially available concrete repair coating formulations. The most common are based upon plaster or plaster Portland cement blends such as Mapei's self-leveler plus. These require a clean surface and a precoat of a bonding agent, typically a latex emulsion. The use of plaster also restricts the product to indoor use.

Another product is Rapid Set's repair product which is based upon Portland cement. This product requires extensive surface preparation including water blasting. Still other commercial products require acid etching in addition.

This document relates to a new and improved concrete repair coating formulation that exhibits a number of unique and very desirable properties. The concrete repair coating formulation has unusually high bonding force. Within 24 hours, it achieves an average of 13 MPa (1,855 psi) of bond strength using a modified slant shear test (based on ASTM C882 [1]), and at 28 days, the test specimens split in a direction perpendicular to the bonded surface indicating the bonding exceeded the strength of concrete substrate used (29 MPa or 4,200 psi). It readily bonds to Portland cement concrete without any preparation other than simple sweeping. This is true even for old and dirty concrete. As noted above, repairing old Portland cement with a Portland cement product requires extensive surface preparation including water blasting, and for some products, acid etching. Other products require a precoat bonding agent. Thus, the new and improved concrete repair coating formulation is very user friendly compared to state-of-the-art formulations.

The concrete repair coating formulation disclosed herein has an unusually high rate of strength development; a repaired surface can be put into service in as little as 4 hours. It achieved an average compressive strength of 6.4 MPa (930 psi) in 4 hours, 40.2 MPa (5,830 psi) in one day, and 48.8 MPa (7,080 psi) in 28 days following ASTM C109 [2]. The product is also "double duty" in that it can be used indoors or outdoors to repair concrete. It also has what we believe is a unique property in that it will bond with weathered asphalt and can be used to repair and resurface this material as well. The product is naturally light in color and can accept coloring agents. It is self-leveling and produces a smooth surface.

In light of these benefits and advantages, it is believed that the concrete repair coating formulation described herein represents a significant advance in the art.

SUMMARY

In accordance with the purposes and benefits described herein, a new and improved concrete repair coating formulation is provided. That concrete repair formulation comprises: (a) a cement component including a calcium sulfoaluminate cement and a Portland cement and (b) an aggregate component including "coarse" aggregates between 62.5 microns and 500 microns in diameter and "fine" aggregates less than 62.5 microns in diameter.

In one or more of the many possible embodiments of the concrete repair formulation, the cement component has a ratio by weight of Portland cement to calcium sulfoaluminate cement ranging from 1/19 to 1/5.66.

In one or more of the many possible embodiments of the concrete repair formulation, the coarse aggregates include screen fractions of limestone, dolomitic limestone, dolomite or quartz sand of (a) from minus 500 microns by plus 250 microns in size, constituting between 10-25% by weight of total product, (b) minus 250 microns by plus 125 microns constituting between 20-35% by weight of the total product, and (c) minus 125 microns by plus 62.5 microns constituting 6% to 10% by weight of the total product.

In one or more of the many possible embodiments of the concrete repair formulation, the coarse aggregates are 50% to 60% by weight above 62.5 microns in diameter of the total product.

In one or more of the many possible embodiments of the concrete repair formulation, the fine aggregates include a fraction of limestone, dolomitic limestone, dolomite or quartz sand of less than 62.5 microns constituting from 4% to 8% of the total product weight.

In one or more of the many possible embodiments of the concrete repair formulation, the fine aggregates also include quartz with an average diameter (d50) of 5 micron that constitutes between 5-15% by weight of the total concrete repair coating formulation.

In one or more of the many possible embodiments of the concrete repair coating formulation, the formulation further includes a set time retarder. The set time retarded may be selected from a group of set time retarding agents including, but not necessarily limited to, citric acid, tartaric acid, glucose and combinations thereof. The set time retarder may be provided in a dosage range of 0.20-0.40% by weight of the total concrete repair coating formulation.

In one or more of the many possible embodiments of the concrete repair coating formulation, the formulation further includes a water reducing agent. That water reducing agent may be selected from a group of water reducing agents including, but not necessarily limited to, naphthalene sulfonates, polycarboxylate or melamine-based agents and combinations thereof. The water reducing agent may be provided at a dosage range of 0.75-1.25% by weight of the total concrete repair coating formulation.

In one or more of the many possible embodiments of the concrete repair coating formulation, the formulation further includes a defoaming (aka anti-foaming) agent. The deforming agent may be selected from a group of defoaming agents including, but not necessarily limited to, petroleum distillates and ethoxylated alcohols on a silica carrier. The defoaming agent may be provided at a dosage range of 0.5%-1.0% by weight of the total concrete repair coating formulation.

In accordance with yet another aspect, a new and improved concrete repair coating formulation comprises (a) a cement component including a calcium sulfoaluminate cement and a Portland cement having a ratio by weight of Portland cement to calcium sulfoaluminate cement ranging from 1/19 to 1/5.66, (b) an aggregate component with gradation spanning 500 microns to less than 5 microns, (c) a set time retarder (d) a water reducing agent (e) and a defoaming agent.

In accordance with yet another aspect, a kit for concrete repair comprises; (a) a vessel including a dry concrete repair coating formulation having a cement component, including a calcium sulfoaluminate cement and a Portland cement having a ratio by weight of Portland cement to calcium sulfoaluminate cement ranging from 1/19 to 1/5.66, an aggregate component with gradation spanning 500 microns to less than 5 microns, a set time retarder, a water reducing agent, and a defoaming agent, and (b) a premeasured water additive package adapted to prevent a user from overdosing the dry concrete repair coating formulation with water.

In the following description, there are shown and described several embodiments of the concrete repair coating formulation and a kit for concrete repair incorporating the concrete repair coating formulation and a premeasured water additive package. As it should be realized, the concrete repair coating formulation and concrete repair kit are capable of other, different embodiments and their several details are capable of modification in various, obvious aspects all without departing from the concrete repair coating formulation and concrete repair kit as set forth and described in the following claims. Accordingly, the drawings and descriptions should be regarded as illustrative in nature and not as restrictive.

BRIEF DESCRIPTION OF THE DRAWING FIGURES

Figure 1:
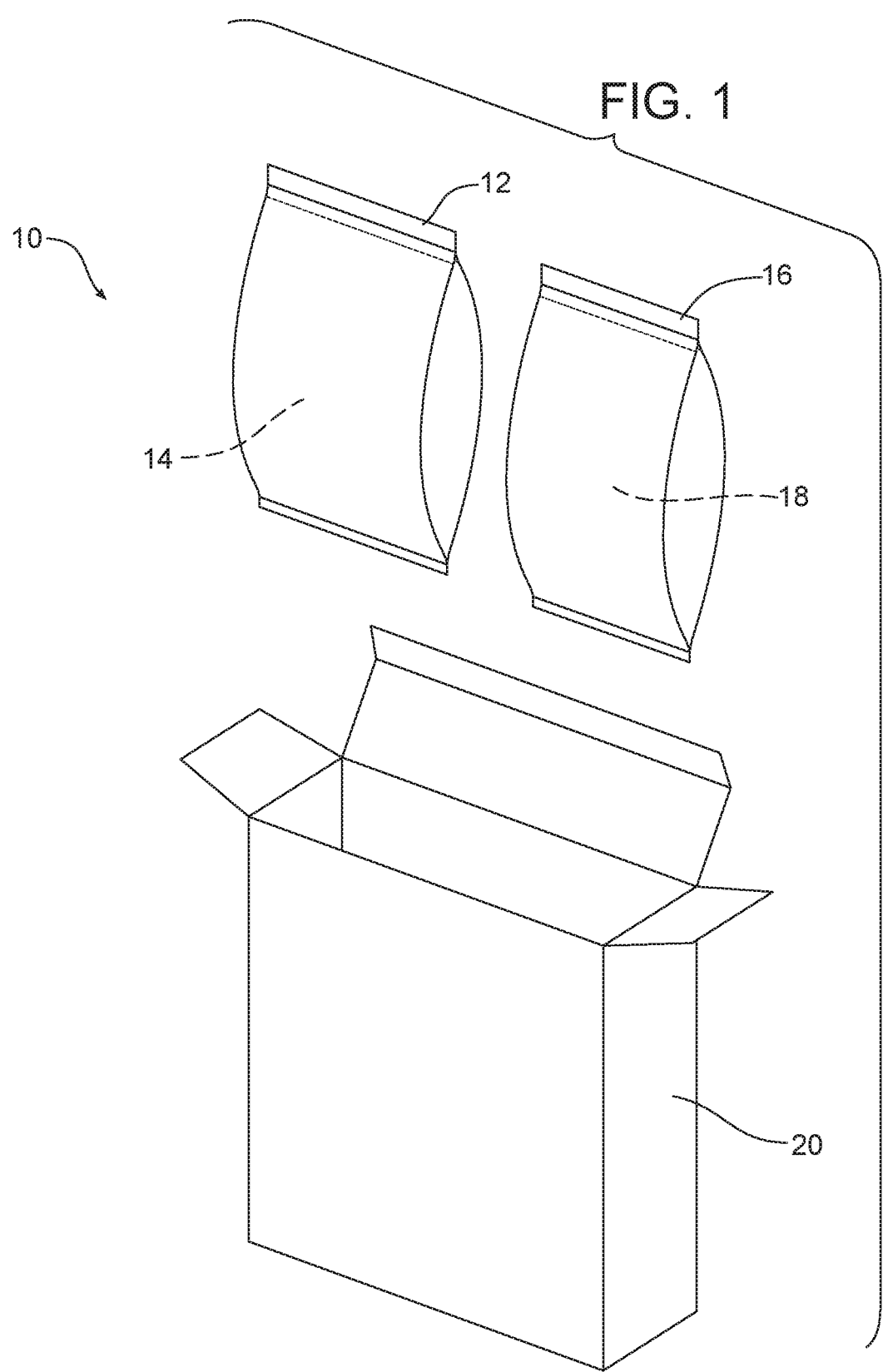
FIG. 1 illustrates the new and improved concrete repair kit including a vessel or pouch of a dry concrete repair coating formulation and a premeasured water additive package.

Reference will now be made in detail to the present preferred embodiments of the quality assurance device, examples of which are illustrated in the accompanying drawing figures.

DETAILED DESCRIPTION

The new and improved concrete repair coating formulation includes a cement component and an aggregate component. The cement component includes a calcium sulfoaluminate (CSA) cement and a Portland cement, more particularly ordinary Portland cement (OPC). The cement component has a ratio by weight of Portland cement to calcium sulfoaluminate cement ranging from 1/19 to 1/5.66.

The aggregate component includes both coarse aggregates, of limestone, dolomitic limestone, dolomite or quartz sand, between 62.5 and 500 microns in diameter and fine aggregates, of limestone, dolomitic limestone or quartz sand between less than 5 microns to 62.5 microns in diameter. More particularly, the coarse aggregates include screen fractions of (a) less than 500 microns by more than 250 microns constituting between 10-25% by weight of total product, (b) less than 250 microns by more than 125 microns constituting between 20-35% by weight of the total product, and (c) less than 125 microns and more than 62.5 microns constituting of between 6% and 10% by weight of the total product. Still further, the coarse aggregates consist of 50% to 60% by weight of the total product, and can further be defined as consisting of 50% to 60% by weight of particles above 62.5 microns in diameter.

The fine aggregates include limestone, dolomitic limestone and quartz sand of less than 62.5 microns constituting between 4% and 8% by weight of the total product. The fine aggregates further include quartz with an average particle diameter (d50) of approximately 5 microns which constitutes between 5-15% by weight of the total concrete repair coating formulation. Thus, the aggregate component has gradation spanning 500 microns to less than 5 microns.

The concrete repair coating formulation may further include a set time retarder. That set time retarder may be selected from a group of set time retarding agents consisting of citric acid, tartaric acid, glucose and mixtures thereof. In other embodiments of the concrete repair coating formulation, other set time retarding agents known in the art may be used. The set time retarder is provided at a dosage range of 0.20-0.40% by weight of the total concrete repair coating formulation.

The concrete repair coating formulation may further include a water reducing agent. That water reducing agent may be selected from a group of water reducing agents consisting of naphthalene sulfonates, polycarboxylates, or melamine-based agents and combinations thereof. In other embodiments of the concrete repair coating formulation, other water reducing agents known in the art may be used. The water reducing agent is provided at a dosage range of 0.75-1.25% by weight of the total concrete repair coating formulation.

The concrete repair coating formulation may further include a defoaming agent. That defoaming agent may be selected from a group of defoaming agents consisting of petroleum distillates and ethoxylated alcohols on a silica carrier. In other embodiments of the concrete repair coating formulation, other water deforming agents known in the art may be used. The defoaming agent is provided at a dosage range of 0.5%-1.0% by weight of the total concrete repair coating formulation.

FIG. 1 illustrates a kit 10 adapted for concrete repair. That kit 10 includes a vessel or pouch 12 that holds a dry concrete repair coating formulation 14 as set forth and described above. Further, the kit 10 includes a premeasured water additive package 16 that holds the exact amount of water 18 required for use to activate the dry concrete repair coating formulation 14 in the pouch 12. This prevents the user from mixing too much water with the dry concrete repair coating formulation, a common tendency of those using concrete products.

As further illustrated in FIG. 1, the kit 10 may also include a box 20 for holding both of the pouch 12 and the water additive package 16.

While the kit 10 described above is referred to as a "concrete repair kit" since it includes a dry concrete containing formulation, it should be appreciated that it may be used to also repair or patch asphalt surfaces. This is a unique aspect of the kit 10 and the concrete repair coating formulation that is described in this document.

Figure 2:
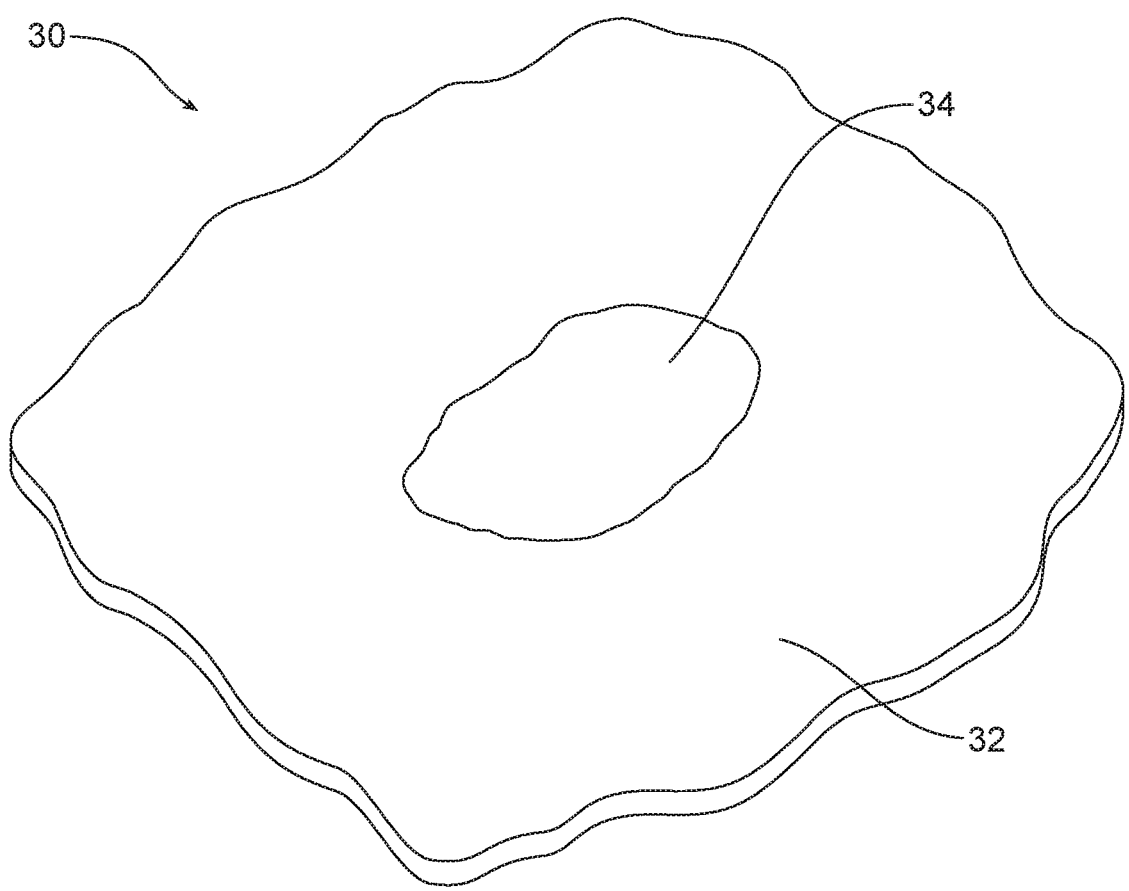
FIG. 2 illustrates an asphalt surface comprising weathered asphalt and a concrete repair coating formulation bound to the weathered asphalt.

FIG. 2 illustrates an asphalt surface 30 which includes the old weathered asphalt 32 that needed repair and the water activated concrete repair coating formulation 34 bound to the weathered asphalt in order to complete the repair.

Experimental Section

Coarse Aggregates (i.e. +62.5 microns). Multiple sizes or fractions of limestone (or dolomitic limestone, dolomite or quartz sand) aggregates ranging up to 500 microns in diameter down to 62.5 microns in diameter are used. These include screen fractions of minus 500 microns (less than 35 U.S. mesh) by 250 microns (plus 60 U.S. Mesh) which constitutes between 10% to 25% percent by weight of the total, but preferably 25% of the total. A limestone fraction of less than 250 microns (60 U.S. mesh screen) by 125 microns (plus 120 U.S. mesh), constitutes between 20% to 35% by weight of the total coarse aggregates, but preferably 25% of the total weight of the product. It is desirable that these fractions of the product constitute 40% to 50% (preferably close to 50%) by weight above 120 microns in diameter of the total weight. The coarse sized aggregates include a fraction of limestone, dolomitic limestone or dolomite of less than 125 microns (120 mesh) by plus 62.5 microns which constitute between 6% to 10% by weight of the total product, but preferably 9%. The coarse sizes keep the water demand low, truncating the upper size at 500 microns, keeps the product from feeling too gritty and allows for a smooth finish. The proscribed gradation of the aggregates makes the product self-leveling.

Fine Aggregates (i.e. less than 62.5 microns). The fine sized aggregates include a limestone fraction of less than 62.5 microns (less than 230 mesh) that comprises between 4% and 8%, but preferably 6% by weight. Finally, the fine quartz aggregate, is Min-U-Sil 5, a 5-micron quartz flour produced by U.S. Silica, which compromises between 5% and 15%, but preferably 10% by weight of the total product. This component gives the product both density and durability. It also contributes to both hardness and abrasion resistance as well as the finish of the product.

Cement. The primary cement is a calcium sulfoaluminate (CSA) as supplied by Buzzi Unicem USA. CSA cement gives the product its superior bonding ability. CSA cement constitutes between 20% and 25% by weight of the total product, preferably 22.2%. Ordinary Portland cement (OPC) is added to improve carbonation resistance and increase alkalinity, this constitutes from 1.1% to 3.3% of the total weight of the product, preferably 2.2%. Further, the ratio of OPC to CSA by weight ranges from 5% to no more than 15%, but preferably at 10%.

Additive Package, Water Reducers. Additives include the use of Conpac 500, a dry high range water reducer produced by the Kerneos Corporation in a dosage from 0.75% to 1.25% percent by weight, preferably 1%. The dosage allows sufficient water to make the product perform like a coating rather than a mortar and yet still maintain a low water cement ratio. Other water reducers available in a powder form, including naphthalene sulfonates and melamine-based agents, may also be used in equivalent dosage.

The preferred water content (W) is, as a ratio to total weight of cement content (CSA+OPC, C), or W/C, of between 55% and 75% as a ratio by weight, preferably 69%, but not to exceed 75%.

Additive Package: Dry Set Time Modifiers. The product also contains a set time retarder, citric acid, in a dosage range of 0.20% to 0.40%. Preferably 0.25% by weight, added in enough quantity to achieve between 40 to 60 minutes of delayed set time. Other suitable set time retarders include tartaric acid and glucose in equivalent dosage. A mixture of dry set time modifiers may also be applied.

Additive Package: Liquid Set Time Modifiers. In another version of this invention, a liquid set time modifier supplied in an additional package may be used, such as that supplied by the RussTech Corporation, comprised of Glucose (10-20%), 2-Hydroxy-1,2,3Propanetricarboxylic Acid (10-20%) Gluconic Acid (10-20%), Tartaric Acid (10-20%), and Polyhydric Alcohol (10-20%). The dosage range for this product is 6 to 16 oz/100 pounds (3.9 to 10.4 ml/kg) of cement, enough to produce 60 minutes of set time reduction. This product may be included with a premeasure water additive package or alone. Prepackaging with water would have the added advantage of keeping the customer from overdosing with water.

Additive Package: Defoaming agent. Additives include a deforming agent Foam Blast® E37 as provided by the DyStar Corporation. This dry free flowing powder, comprised of naphthenic petroleum distillate and ethoxylated alcohol on a silica carrier, is provided at rate of 0.5%-1.0% by weight, preferably 0.8%, of the total concrete repair coating formulation. The additive reduces or eliminates pinholes from bubble entrainment improving the finish of final product.

1. ASTM C882/882M—13, Standard Test Method for Bond Strength of Epoxy-Resin Systems Used with Concrete by Slant Shear.

2. ASTM C109/109M—13, Standard Test Method for Compressive Strength of Hydraulic Cement Mortars (Using 2-in. or [50-mm] Cube Specimens.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A concrete repair coating formulation, comprising:
   a cement component including a calcium sulfoaluminate cement and a Portland cement; and
   an aggregate component including coarse aggregates between 62.5 microns and 500 microns in diameter and fine aggregates between 62.5 microns to less than 5 microns in diameter wherein (a) said cement component has a ratio by weight of Portland cement to calcium sulfoaluminate cement ranging from 1/19 to 1/5.66 and (b) the coarse aggregates include screen fractions of (a) minus 500 microns by plus 250 microns of limestone, dolomitic limestone, dolomite or quartz sand constituting between 10-25% by weight of total product, (b) less than 250 microns by 125 microns constituting between 20-35% by weight of the total product and (c) less than 125 microns by plus 62.5 microns constituting between 6% to 10% by weight of total product.

2. The concrete repair coating formulation of claim 1, wherein said coarse aggregates are 50% to 60% by weight above 62.5 microns in diameter of the total product.

3. The concrete repair coating formulation of claim 2, wherein said fine aggregate of limestone, dolomitic limestone, dolomite and quartz sand fraction of less than 62.5 microns constitutes between 4-8% by weight of the total product.

4. The concrete repair coating formulation of claim 3, wherein said fine aggregates further include a quartz flour filler with an average particle size 5 microns that constitutes between 5-15% by weight of total concrete repair coating formulation.

5. The concrete repair coating formulation of claim 4, further including a set time retarder.

6. The concrete repair coating formulation of claim 5, further including a water reducing agent.

7. The concrete repair coating formulation of claim 6, further including a defoaming agent.

8. The concrete repair coating formulation of claim 7, wherein said set time retarder is selected from a group of set time retarding agents consisting of citric acid, tartaric acid, glucose and combinations thereof.

9. The concrete repair coating formulation of claim 8, wherein said set time retarder is provided at a first dosage range of 0.20-0.40% by weight of the total concrete repair coating formulation.

10. The concrete repair coating formulation of claim 9, wherein said water reducing agent is selected from a group of water reducing agents consisting of naphthalene sulfonates, polycarboxylate and melamine-based agents and combination thereof.

11. The concrete repair coating formulation of claim 10, wherein said water reducing agent is provided at a second dosage range of 0.75-1.25% by weight of the total concrete repair coating formulation.

12. The concrete repair coating formulation of claim 11, wherein said defoaming agent is selected from a group of defoaming agents consisting of petroleum distillates and ethoxylated alcohols on a silica carrier.

13. The concrete repair coating formulation of claim 12, wherein said defoaming agent is provided at a dosage range of 0.5%-1.0% of the total concrete coating formulation.

14. A concrete repair coating formulation, comprising:
a cement component consisting of a calcium sulfoaluminate cement and a Portland cement having a ratio by weight of Portland cement to calcium sulfoaluminate cement ranging from 1/19 to 1/5.66;
an aggregate component with gradation spanning from 500 microns to less than 5 microns;
a set time retarder;
a water reducing agent;
and a defoaming agent.

15. A kit for concrete repair, comprising:
a vessel including a dry concrete repair coating formulation including a cement component consisting of a calcium sulfoaluminate cement and a Portland cement having a ratio by weight of Portland cement to calcium sulfoaluminate cement ranging from 1/19 to 1/5.66 and an aggregate component with gradation spanning from 500 µm to less than 5 µm, a set time retarder; a water reducing agent; a defoaming agent and
a premeasured water additive package adapted to prevent a user from overdosing with water.

16. An asphalt surface, comprising:
weathered asphalt; and
a concrete repair coating formulation bound to said weathered asphalt, said concrete repair coating formulation including (a) a cement component including a calcium sulfoaluminate cement and a Portland cement having a ratio by weight of Portland cement to calcium sulfoaluminate cement ranging from 1/19 to 1/5.66, (b) an aggregate component with gradation spanning 500 microns to 5 microns, (c) a set time retarder and (d) a water reducing agent (e) and a defoaming agent.

17. A concrete repair coating formulation, comprising:
a cement component including a calcium sulfoaluminate cement and a Portland cement; and
an aggregate component including coarse aggregates between 62.5 microns and 500 microns in diameter and fine aggregates between 62.5 microns to less than 5 microns in diameter wherein said course aggregates include screen fractions of limestone, dolomitic limestone, dolomite or quartz sand coarse aggregates including screen fractions of (a) minus 500 microns by plus 250 microns constituting between 10-25% by weight of the total product; (b) less than 250 microns by more than 125 microns constituting of between 20-35% by weight of the total product and (c) less than 125 microns by plus 62.5 microns constituting between 6-10% by weight of total product.

18. The concrete repair coating formulation of claim 17, wherein said coarse aggregates are 60% by weight above 62.5 microns in diameter of the total product.

19. The concrete repair coating formulation of claim 18, wherein said fine aggregates include a limestone, dolomitic limestone, dolomite or quartz sand fraction of less than 62.5 microns constituting between 4-8% by weight of the total product.

20. The concrete repair coating formulation of claim 19, wherein said fine aggregates further include a quartz flour filler with an average (d50) particle size of 5 micron that constitutes between 5-15% by weight of total concrete repair coating formulation.

\* \* \* \* \*